(12) United States Patent
Luebben et al.

(10) Patent No.: US 9,387,863 B2
(45) Date of Patent: Jul. 12, 2016

(54) RAIL VEHICLE SYSTEM

(75) Inventors: Edzard Luebben, Erlangen (DE);
Martin Offer, Weilersbach (DE);
Juergen Schlaht, Fuerth (DE); Joerg Schneider, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/344,505

(22) PCT Filed: Aug. 21, 2012

(86) PCT No.: PCT/EP2012/066230
§ 371 (c)(1),
(2), (4) Date: Mar. 12, 2014

(87) PCT Pub. No.: WO2013/037608
PCT Pub. Date: Mar. 21, 2013

(65) Prior Publication Data
US 2014/0338558 A1    Nov. 20, 2014

(30) Foreign Application Priority Data

Sep. 12, 2011  (DE) .......................... 10 2011 082 516

(51) Int. Cl.
*B60L 5/00*      (2006.01)
*B61C 3/00*      (2006.01)
*B60L 5/22*      (2006.01)
(Continued)

(52) U.S. Cl.
CPC ... *B61C 3/00* (2013.01); *B60L 5/22* (2013.01);
*B61C 17/12* (2013.01); *B61D 1/00* (2013.01)

(58) Field of Classification Search
CPC .............. B60L 1/00; B60L 3/00; B60L 5/00;
B60L 5/18; B60L 5/22; B60L 5/24; B60L
9/00; B61C 3/00; B61C 3/02; B61C 11/00
USPC .......... 105/1.4, 26.05–27, 34.1, 34.2, 49, 96,
105/133; 191/2, 3, 45 R–47, 50, 55
See application file for complete search history.

(56) References Cited

U.S. PATENT DOCUMENTS

| 5,531,301 A | 7/1996 | Makino et al. |
| 9,108,645 B2 | 8/2015 | Shimada et al. |

FOREIGN PATENT DOCUMENTS

| CN | 201193028 Y | 2/2009 |
| CN | 101562423 A | 10/2009 |

(Continued)

OTHER PUBLICATIONS

M.M. Avdeev et al.; "Wechselstrom-Elektrozüge" [Alternating Current Electric Trains], Verlag: Transport, pp. 3-5; 256-266 and 327-333; 1985;—English translation.

*Primary Examiner* — R. J. McCarry, Jr.
(74) *Attorney, Agent, or Firm* — Laurence Greenberg; Werner Stemer; Ralph Locher

(57) ABSTRACT

A rail vehicle system includes a set of cars for transporting passengers. The set has two end cars, at least one driveless central car and at least one central car constructed as a traction car having at least one drive unit. In order to achieve greater flexibility in assembling a rail vehicle system, in particular with regard to improved scalability of traction power, the traction car includes a power supply unit for the drive unit and has at least one voltage transformation unit and a power converter unit.

7 Claims, 1 Drawing Sheet

(51) Int. Cl.
    *B61C 17/12*    (2006.01)
    *B61D 1/00*     (2006.01)

(56) References Cited

FOREIGN PATENT DOCUMENTS

| | | | |
|---|---|---|---|
| CN | 101598562 A | 12/2009 | |
| DE | 10064973 A1 | 6/2002 | |
| DE | 102008004273 A1 | 7/2009 | |
| DE | 102010009250 A1 | 8/2011 | |
| EP | 0605214 A2 | 7/1994 | |
| EP | 0973247 B1 | 9/2007 | |
| EP | 2078633 A2 | 7/2009 | |
| EP | 2179905 * | 4/2010 | ............... B61C 3/00 |
| EP | 2179905 A1 | 4/2010 | |
| EP | 2199173 A1 | 6/2010 | |
| EP | 2221228 * | 8/2010 | ............. B61C 17/04 |
| EP | 2221228 A2 | 8/2010 | |
| JP | 2011019326 A | 1/2011 | |
| RU | 99388 U1 | 11/2010 | |
| WO | 2010146643 A1 | 12/2010 | |

* cited by examiner

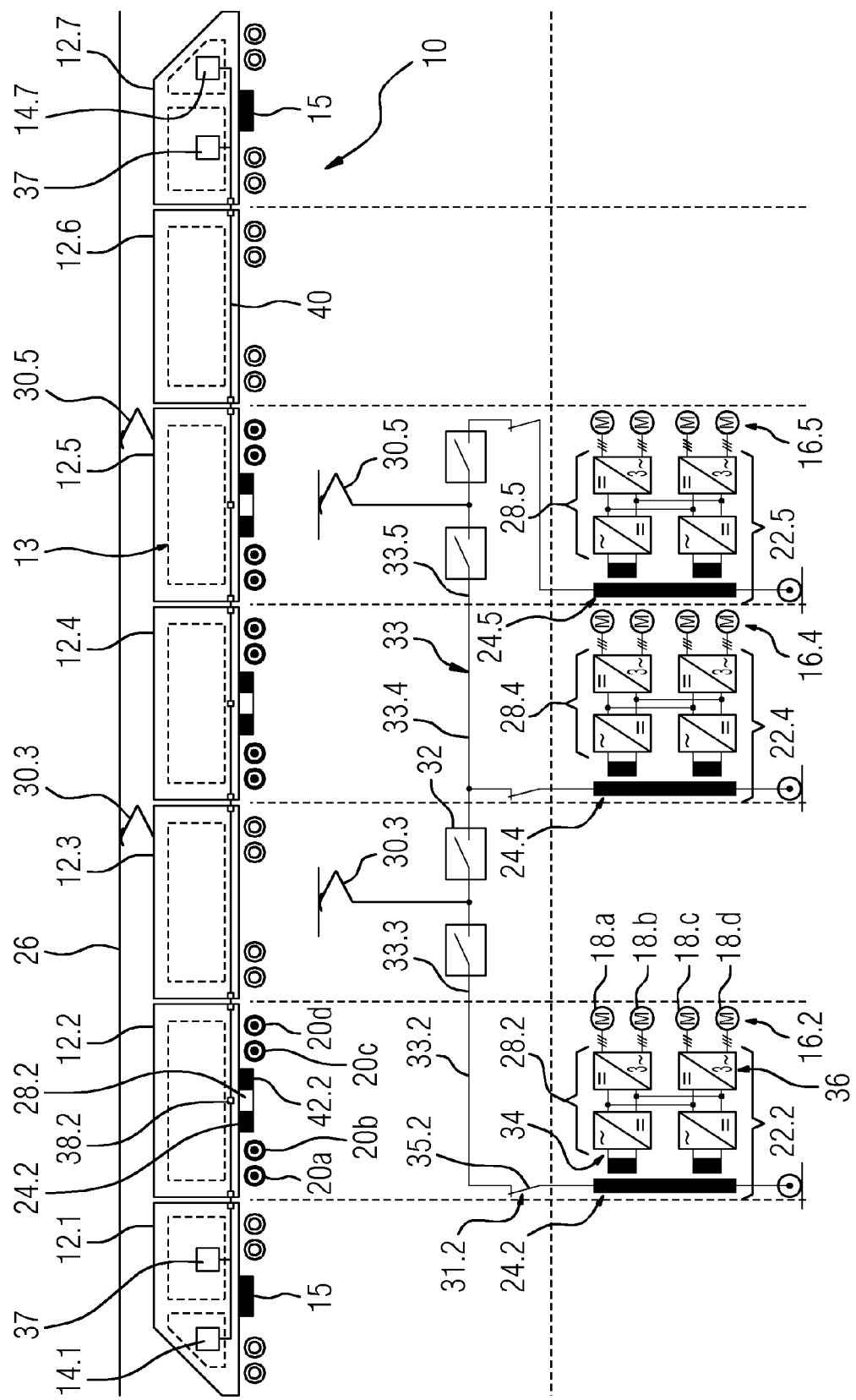

RAIL VEHICLE SYSTEM

BACKGROUND OF THE INVENTION

Field of the Invention

The invention relates to a rail vehicle system comprising a set of cars which are provided for transporting passengers, wherein the set has two end cars, at least one driveless central car and at least one central car which is in the form of a traction car and has at least one drive unit.

In modern designs of multiple-unit trains, traction which is performed by means of at least one drive which is arranged in a central car is widespread. Therefore, a distinction can be drawn between a driveless central car and a central car which is provided with a drive—also called a traction car—in a rail vehicle system. The principle of distributed traction is applied in respect of providing a power for the drive of the traction car since the components of the traction and high-voltage equipment which are required for the drive are distributed over several cars in the train system.

This has the disadvantage that scaling of the traction power can be achieved only by adjusting several cars.

BRIEF SUMMARY OF THE INVENTION

The invention is based on the object of achieving greater flexibility for assembling a rail vehicle system, in particular in respect of improved scalability of the traction power.

To this end, it is proposed that the traction car comprises a power supply unit which is provided for the drive unit and has at least one voltage transformation unit and one current converter unit. By this means, components of the power supply unit, which are indispensable for operation of the drive unit, can be concentrated in the traction car. The traction power can accordingly be better adapted by adding or removing a traction car in the proposed embodiment than in the case of distributed traction, as a result of which a particularly high level of scalability of this traction power can be achieved. A substantial proportion of the available power can be maintained in the case of redundancy by using a plurality of traction cars in the rail vehicle system, wherein prescribed requirements (in particular in the form of international standards) can be complied with to the full extent. It is particularly advantageously possible for several traction cars to be positioned one behind the other.

The flexibility during use of the driveless central cars can also be increased by the concentration of the components, which are required for the drive unit of a traction car, in this traction car since said driveless central cars—in contrast to the principle of distributed traction—preferably do not have such components. A large selection of different train lengths can be achieved by virtue of the flexible use of driveless central cars.

A "power supply unit" for the drive unit is intended to be understood, in particular, as a unit which is provided for providing an, in particular, variable power which is required for operating the drive unit. To this end, the power supply unit has the current converter unit which serves to adjust the properties—such as, in particular, frequency and/or voltage—of electrical currents according to a power requirement by the drive unit. Known designs from the prior art are based on the use of power components with semiconductor switches, in particular transistors, such as so-called IGBTs for example, wherein said semiconductor switches are controlled in accordance with a switching strategy which is determined by the power which is to be output. In order to change a high electrical voltage into a voltage which is adjusted for operation of the current converter unit, the power supply unit has the voltage transformation unit. The voltage transformation unit serves, in particular, to convert a high voltage, which is drawn from an external supply system via a current tap, into a lower voltage. The voltage transformation unit can, for example, be in the form of a transformer.

It is further proposed that the rail vehicle system has at least one control device and the traction car comprises a control interface, by means of which an operative connection to the control device can be established, and an energy supply interface, by means of which a connection to a track-side energy supply system can be established, wherein the drive unit can be operated in an autonomous manner by virtue of the power supply unit interacting with the control interface and the energy supply interface. As a result, operation of the drive unit is advantageously exclusively dependent on the operative connection to the control device via the control interface, on the provision of electrical energy via the energy supply interface and on the local power supply unit. This restriction preferably applies only in respect of the provision of the power which is to be output, wherein further interfaces, such as a brake interface for example, can likewise be provided in the traction car, said interfaces not, however, being related to the power which is to be achieved.

In an equivalent formulation, the drive unit, for the operation thereof, is independent of further power components which are arranged outside the traction car. In this way, the traction car which is supplied with electrical energy and fed with control signals can be driven independently of the use of a further central car. This can be performed, for example, by coupling the traction car only to an end car which is provided with the control device.

The control device is preferably provided at least for the purpose of controlling the drive unit as a function of control commands which are input by a vehicle driver. To this end, said control device expediently has an interface which is operatively connected to an operator control device, for example an operator control panel, which is arranged in an end car. Furthermore, the control unit is advantageously provided for the purpose of automatically generating control commands for the drive unit. This can be performed, in particular, in conjunction with safety regulations in order, for example, to force braking, and/or when the control device processes track-side influencing signals.

In a further embodiment of the rail vehicle system, it is proposed that the end cars are driveless.

The functionality of the traction car can furthermore be advantageously extended by the traction car having a converter which is provided for providing an auxiliary operating power. An "auxiliary operating power" is intended to mean, in particular, a power for operating electrical loads of the traction car and/or of at least one further car of the rail vehicle system, which electrical loads are different from a drive unit.

In order to increase the redundancy within the drive unit, it is proposed that the drive unit has at least two drive motors, and a current converter of the current converter unit is provided for supplying power to the at least two drive motors.

In a further embodiment of the rail vehicle system, it is proposed that the drive unit has a plurality of drive motors, wherein the number of drive motors corresponds to the number of traction car axles. In this case, one pair of drive motors preferably in each case corresponds to one pair of drive axles of a bogie.

It is further proposed that the cars each have a line section, wherein the line sections, in interaction, form a system-wide high-voltage line which can be coupled to a track-side energy supply system, and the traction car has at least one switch which is provided for releasable coupling the power supply unit to the high-voltage line. As a result, the traction car can be coupled to or disconnected from the high-voltage supply of the entire rail vehicle system in a structurally simple manner. In the event of a defect in the drive unit of the traction car, said traction car can be simply disconnected from the high-voltage supply, without there being any reaction on the other cars of the rail vehicle system.

BRIEF DESCRIPTION OF THE SINGLE VIEW OF THE DRAWING

An exemplary embodiment of the invention will be explained with reference to the drawing.

DESCRIPTION OF THE INVENTION

The drawing shows a schematic side view of a rail vehicle system 10 which is in the form of a multiple-unit train.

Said rail vehicle system has a set of cars 12.1 to 12.7 which are coupled to one another and are each provided for transporting passengers and, to this end, each comprise a passenger compartment 13. The number of cars 12 of the rail vehicle system 10 is an example, wherein a higher number or a lower number is feasible.

The set has two end cars 12.1 and 12.7 between which the central cars 12.2 to 12.6 are arranged. An operator control device 14.1 or 14.7, which is provided for operator control by a vehicle driver, and also a battery unit 15 are arranged in each of the end cars 12.1, 12.7. Said operator control device has an operator control panel (not illustrated in any detail) by means of which the vehicle driver can input control commands.

The rail vehicle system 10 comprises two driveless central cars 12.3 and 12.6, wherein the end cars 12.1, 12.7 are likewise driveless. The central cars 12.2, 12.4 and 12.5 are each provided with a drive unit 16.2, 16.4 or 16.5 and are called traction cars. The drive units 16.2, 16.4 and 16.5 are, in particular, of identical design and each comprise four drive motors 18.a to 18.d which are each associated with a drive axle 20.a to 20.d of the corresponding traction car. In order to distinguish between drive axles and driveless axles, the drive axles are colored black. The traction cars 12.2, 12.4 and 12.5 each have four drive axles 20, whereas the driveless central cars 12.3 and 12.6 and the end cars 12.1 and 12.7 are provided only with driveless axles.

The drive units 16.2, 16.4, 16.5 are shown beneath the rail vehicle system 10 in the schematic circuit diagram, wherein the functional blocks of the circuit diagram are associated with the different traction cars using vertical dashed lines. The set of drive motors 18.a to 18.d can be divided into two pairs which are each associated with one bogey of the respective traction vehicle.

The central car 12.2, which is in the form of a traction car, has a power supply unit 22.2 which is provided for providing an electrical power for the drive unit 16.2. The power supply unit 22.2 comprises a voltage transformation unit 24.2, which serves to convert a high voltage, which is drawn from a track-side energy supply system 26, into a lower voltage, and a current converter unit 28.2.

The high electrical voltage is drawn via a current tap 30.3 and/or 30.5 which is arranged on the roof of the driveless central car 12.3 or of the central car 12.5 which is in the form of a traction car. In an alternative embodiment, it is feasible that a central and/or end car 12 is provided with several current taps 30. Main switches 32, which are present in the central car 12.3 and in the central car 12.5 which is in the form of a traction car, are provided for disconnecting the power supply unit 22.2 from the energy supply system 26.

High voltage is supplied to the entire rail vehicle system 10 by means of a system-wide high-voltage line 33 (only partially illustrated in the drawing) which runs over the entire rail vehicle system 10. Each car 12.1 to 12.7 has—preferably on the car roof—a line section 33.1 to 33.7, wherein the high-voltage line 33 is formed by assembling the rail vehicle system 10, that is to say by coupling the cars 12.1 to 12.7 and therefore the line sections 33.1 to 33.7 to one another. In this case, the main switches 32 constitute an interface between the energy supply system 36 and the high-voltage line 33.

The traction car 12.2 has an energy supply interface 31.2 which serves to establish an operative connection between the power supply unit 22.2 and the energy supply system 26. In this case, the energy supply interface 31.2 comprises a switch 35.2 by means of which the traction car 12.2 can be connected to the high-voltage line 33 and therefore to the energy supply system 26 and can be separated from said elements. In the event of a fault, the traction car 12.2 can be disconnected from the high-voltage line 33, without there being disadvantageous consequences for the other cars 12 of the rail vehicle system.

The current converter unit 28.2 has a first current converter 34 and a second current converter 36. The first current converter 34 is provided for supplying a first pair of drive motors 18.a, 18.b, whereas the second current converter 36 is associated with a second pair of drive motors 18c, 18d. The first current converter 34 can, if required—for example in the event of failure of the second current converter 36—, be associated with the second pair of drive motors 18c, 18d. This accordingly also applies to the second current converter 36 which can be associated with the first pair of drive motors 18.a, 18.b.

The rail vehicle system 10 has at least one control device 37 which is provided for, in particular train-wide, distribution of control commands for the operation of the drive units 16, in particular of the drive unit 16.2. The central car 12.2, which is in the form of a traction car, has a control interface 38.2 in this case, it being possible for said control interface to connect the power supply unit 22.2 to the control device 37. This is performed by means of a train-wide control line 40 which corresponds, for example, to a vehicle bus and connects the control device 37 to the control interface 38.2 of the traction car. Several control devices 37 can be provided—as illustrated in the FIGURE by way of example. In the embodiment under consideration, a control device 37 is arranged in each of the end cars 12.1, 12.7. The control devices 37 are each operatively connected to the operator control device 14.1 and, respectively, 14.7 via the control line 40, as a result of which control commands from the vehicle driver can be made available for the drive unit 16.2 via the control device 37 and the control line 40 by means of the control interface 38.2. The control device 37 is also operatively connected to a driving assistance device (not shown in any detail) which receives and processes control commands from a track-side influencing system.

The drive unit 16.2 of the traction car can be operated in a fully autonomous manner by means of the power supply unit 22.2 by all of the components of the power supply unit 22.2 which are required for operating the drive unit 16.2 being arranged only locally in the traction car. In this case, said components are controlled by means of control signals which are generated by the control device 37 and are transmitted to the power supply unit 22.2 via the train-wide control line 40 and the control interface 38.2, and they are supplied with electrical energy which is drawn via the energy supply interface 31.2.

The traction car also comprises a further current converter 42.2 which is provided for providing an auxiliary operating power. This auxiliary operating power serves to operate current loads, such as cooling assemblies for example, which are different from the drive unit 16.2 and which are connected to the so-called on-board supply system.

The power supply unit 22.2 comprising the voltage transformation unit 24.2 and the current converter unit 28.2, and also the further current converter 42.2 are arranged below the floor of the traction car.

The central cars 12.4 and 12.5, which are in the form of traction cars, are of identical design to the central car 12.2—in respect of the design and the control of the power supply units 22.4, 22.5—and therefore reference is made to the above description in order to avoid unnecessary repetition. The traction power of the rail vehicle system 10 can be scaled in a particularly simple manner by adding or removing traction cars according to the embodiment of the central car 12.2.

The invention claimed is:

1. A rail vehicle system, comprising:
    a set of cars configured to transport passengers, said set of cars including two end cars, at least one driveless central car and at least one central car being a traction car;
    said traction car having at least one drive unit, and a power supply unit for said at least one drive unit;
    said power supply unit including at least one voltage transformation unit and a current converter unit;
    said cars each having a line section;
    said line sections interacting to form a system-wide high-voltage line configured to be coupled to a track-side energy supply system; and
    said traction car having at least one switch configured to releasably couple said power supply unit to said high-voltage line.

2. The rail vehicle system according to claim 1, which further comprises:
    at least one control device;
    said traction car including a control interface configured to establish an operative connection to said control device; and
    an energy supply interface configured to establish a connection to a track-side energy supply system;
    said drive unit configured to be operated in an autonomous manner due to said power supply unit interacting with said control interface and said energy supply interface.

3. The rail vehicle system according to claim 1, wherein said end cars are driveless.

4. The rail vehicle system according to claim 1, wherein said traction car has a converter configured to provide an auxiliary operating power.

5. The rail vehicle system according to claim 1, wherein said drive unit has at least two drive motors, and said current converter unit has a current converter configured to supply power to said at least two drive motors.

6. The rail vehicle system according to claim 1, wherein said traction car has a number of axles, and said drive unit has a number of drive motors corresponding to said number of axles.

7. The rail vehicle system according to claim 1, wherein said system-wide high voltage line extends along said set of cars.

* * * * *